(12) United States Patent
Kim et al.

(10) Patent No.: US 10,554,113 B1
(45) Date of Patent: Feb. 4, 2020

(54) CONTROL SYSTEM AND METHOD OF LOW VOLTAGE DC-DC CONVERTER

(71) Applicants: Hyundai Motor Company, Seoul (KR); Kia Motors Corporation, Seoul (KR)

(72) Inventors: Jee Heon Kim, Gyeonggi-do (KR); Ho Joong Lee, Gyeonggi-do (KR); Han Shin Youn, Seoul (KR); Dong Jun Lee, Gyeonggi-do (KR); Hye Seung Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/406,682

(22) Filed: May 8, 2019

(30) Foreign Application Priority Data

Dec. 3, 2018  (KR) .......................... 10-2018-0153920

(51) Int. Cl.
*H02M 3/335* (2006.01)
*H02M 1/08* (2006.01)
(Continued)

(52) U.S. Cl.
CPC ................ *H02M 1/08* (2013.01); *B60L 1/00* (2013.01); *B60L 53/22* (2019.02); *H02M 1/44* (2013.01); *H02M 3/156* (2013.01); *H02M 3/33515* (2013.01); *H02M 3/33546* (2013.01); *H02M 3/33569* (2013.01); *B60L 2210/10* (2013.01); *H02M 2001/0012* (2013.01)

(58) Field of Classification Search
CPC ......... H02M 3/33546; H02M 3/33569; H02M 1/44; H02M 3/33515
See application file for complete search history.

(56) References Cited

U.S. PATENT DOCUMENTS 5,615,099 A * 3/1997 Nakazawa .......... H02M 7/1623
363/41
6,911,808 B1 * 6/2005 Shimamori ........... H02M 3/157
323/283
(Continued)

FOREIGN PATENT DOCUMENTS

KR  20180066697 A  6/2018

*Primary Examiner* — Yusef A Ahmed
*Assistant Examiner* — Ishrat F Jamali
(74) *Attorney, Agent, or Firm* — Mintz Levin Cohn Ferris Glovsky and Popeo, P.C.; Peter F. Corless (57) ABSTRACT

A control system of a low voltage DC-DC converter is provided. The system includes a low voltage DC-DC converter unit that has a power semiconductor element and converts power supplied from a high voltage battery of a vehicle into power of low voltage. A switching frequency change unit changes a switching frequency of the power semiconductor element and a microcomputer generates a final PWM signal based on an input voltage value input from the high voltage battery and an output voltage value of the switching frequency change unit to apply a maximum duty command voltage to a PWM controller. The PWM controller applies PWM voltage to the power semiconductor element to thus operate the power semiconductor element at less than a maximum duty based on the maximum duty command voltage applied from the microcomputer.

9 Claims, 8 Drawing Sheets

(51) Int. Cl.
*H02M 3/156* (2006.01)
*B60L 1/00* (2006.01)
*B60L 53/22* (2019.01)
*H02M 1/44* (2007.01)
*H02M 1/00* (2006.01)

(56) References Cited

U.S. PATENT DOCUMENTS

| | | | |
|---|---|---|---|
| 8,760,141 B2* | 6/2014 | Man | H02M 1/44 |
| | | | 323/284 |
| 9,660,526 B2* | 5/2017 | Li | H02M 3/158 |
| 2009/0115362 A1* | 5/2009 | Saha | B60L 15/025 |
| | | | 318/400.09 |
| 2017/0151877 A1* | 6/2017 | Chun | H02M 3/33546 |

* cited by examiner

FIG. 1

RELATED ART

| $V_{in}$ (V) | $D_{temp}$ |
|---|---|
| 180 | 38.1% |
| 210 | 39.7% |
| 240 | 45.7% |
| 310 | 56.2% |
| 350 | 62.2% |
| 410 | 72.4% |
| 470 | 81.7% |

FIG. 5

| $V_{SSFM}$ (V) | Factor value (factor) |
|---|---|
| 1.5 | 1.06 |
| 2.5 | 1 |
| 3.5 | 0.94 |

FIG. 6

RELATED ART

CONTROL SYSTEM AND METHOD OF LOW VOLTAGE DC-DC CONVERTER

CROSS REFERENCE TO RELATED APPLICATION

The present application claims priority to Korean Patent Application No. 10-2018-0153920, filed Dec. 3, 2018, the entire contents of which is incorporated herein for all purposes by this reference.

BACKGROUND

Field of the Invention

The present invention relates to a control system and method of a low voltage direct current-direct current (DC-DC) converter and, more particularly, to a control system and method of a low voltage DC-DC converter that prevent a clamp capacitor and a power semiconductor in the low voltage DC-DC converter from being damaged when a control abnormality occurs due to a disturbance or the like.

Description of the Related Art

A low voltage DC-DC converter (LDC) that supplies power to an auxiliary battery and an electric field load of the environmentally friendly vehicle is required to have a high power density since it is mounted within the engine room of the vehicle and high efficiency since the efficiency of the LDC directly affects vehicle fuel efficiency. Accordingly, research regarding an LDC has been actively conducted.

Figure 1:
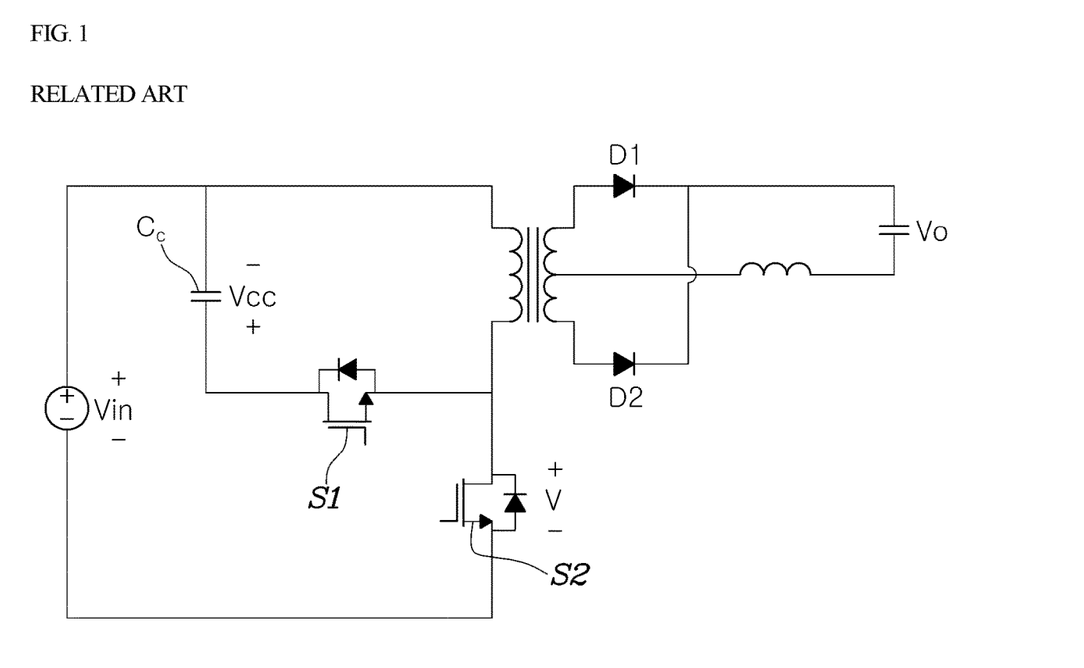
FIG. 1 is a view illustrating a conventional ACF converter according to the related art.

Conventionally, various topologies for satisfying the high power density and efficiency of an LDC have been studied. Recently, an active clamp forward (ACF) converter as shown in FIG. 1, has been developed with a reduced number of elements, zero volt switching (ZVS) characteristics, and a low conduction loss thereof. However, the conventional ACF converter has high voltage stress, since input voltage and voltage of a clamp capacitor Cc are applied to switching elements due to a structure of an active clamp. Further, when a switching duty of the switching elements S1 and S2 is increased due to a control failure caused by disturbance or the like, the voltage of the clamp capacitor increases, whereby the voltage applied to the clamp capacitor and the switching element exceeds withstand voltage and damage of the LDC may occur.

Meanwhile, to protect the clamp capacitor and the switching elements of the ACF converter in the conventional technologies, a method of limiting a maximum switching duty of the switching elements has been developed. However, according to the conventional method, since the maximum duty limiting value is fixed even when the input voltage varies, when a control malfunction occurs due to disturbance or the like at a high input voltage, the switching elements may operate at a maximum duty. Accordingly, the voltage may exceed the withstand voltage of the clamp capacitor and the switching elements, and thus, damage may occur to corresponding elements. Therefore, there is a need to develop a technique for preventing the clamp capacitor and the switching elements in the LDC from being damaged even when a control abnormality occurs due to a disturbance or the like.

SUMMARY

The present invention provides a control system and method of a low voltage DC-DC converter (LDC) capable of preventing the clamp capacitor and the power semiconductor in the LDC from being damaged even when a control abnormality occurs due to disturbance or the like, by limiting the maximum duty of switching of power semiconductor elements of the LDC based on input voltage input from a high voltage battery and output voltage of a switching frequency change unit.

In order to achieve the above object, according to the present invention, a control system of a low voltage DC-DC converter (LDC) may include: a low voltage DC-DC converter unit having a power semiconductor element and configured to convert power supplied from a high voltage battery of a vehicle into the power of low voltage; a switching frequency change unit configured to change a switching frequency of the power semiconductor element; a microcomputer configured to generate a final pulse width modulation (PWM) signal based on an input voltage value input from the high voltage battery and an output voltage value of the switching frequency change unit to apply a maximum duty command voltage to a PWM IC; and the PWM IC (e.g., PWM controller) configured to apply PWM voltage to the power semiconductor element to prevent the power semiconductor element from exceeding a maximum duty based on the maximum duty command voltage applied from the microcomputer.

The microcomputer may include: a temporary PWM signal generation unit configured to generate a duty of a temporary PWM signal for generating a maximum duty command voltage input to the PWM IC based on an input voltage input from the high voltage battery; a PWM adjustment factor generation unit configured to generate an adjustment factor value based on an output voltage of the switching frequency change unit; a multiplier configured to multiply the duty of the temporary PWM signal generated in the temporary PWM signal generation unit by the adjustment factor value generated in the PWM adjustment factor generation unit; and a final PWM signal generation unit configured to generate the maximum duty command voltage based on results of a product operation through the multiplier.

The system may further include a storage unit configured to store a duty information of the PWM signal for generating the maximum duty command voltage input to the PWM IC by the input voltage input from the high voltage battery and a factor value information for eliminating a maximum duty change portion of the power semiconductor element based on the output voltage of the switching frequency change unit. The microcomputer may be configured to derive a duty value of the temporary PWM signal for generating the maximum duty command voltage input to the PWM IC based on the input voltage and a factor value based on the output voltage of the switching frequency change unit, based on the input voltage value input from the high voltage battery, the output voltage value of the switching frequency change unit, and the information stored in the storage unit and generate a final PWM signal for generating the maximum duty command voltage based on the duty value of the temporary PWM signal and the factor value derived above, thereby applying the maximum duty command voltage to the PWM IC.

The maximum duty command voltage may be a voltage value for limiting the maximum duty at which the power semiconductor element operates. Additionally, the system may include a filter unit disposed between the microcomputer and the PWM IC and configured to smooth the voltage output from the microcomputer. The system may further include voltage sensors configured to sense voltage input from the high voltage battery and voltage output from the switching frequency change unit, respectively. The microcomputer may be configured to generate the final PWM signal for generating a maximum duty command voltage by multiplying a duty value of a temporary PWM signal for generating the maximum duty command voltage input to the PWM IC based on the input voltage by a factor value based on the output voltage of the switching frequency change unit.

In order to achieve another object described above, according to the present invention, a control method of an LDC may include: sensing voltage input from a high voltage battery and voltage output from a switching frequency change unit; deriving a duty value of a temporary PWM signal for generating a maximum duty command voltage input to a PWM IC according to the input voltage value based on an input voltage value input from the high voltage battery and information stored in a storage unit; deriving a factor value according to the output voltage of the switching frequency change unit based on the output voltage value of the switching frequency change unit and information stored in the storage unit; generating a final PWM signal for generating the maximum duty command voltage based on the duty value of the temporary PWM signal and the factor value derived above, thereby applying the maximum duty command voltage to the PWM IC; and operating a power semiconductor element not to exceed a maximum duty based on the maximum duty command voltage applied thereto.

Prior to sensing the voltage input from the high voltage battery and the voltage input from the switching frequency change unit, the method may further include storing the duty information of the PWM signal for generating the maximum duty command voltage input to the PWM IC by an input voltage input from the high voltage battery and the factor value information for eliminating a maximum switching duty change portion of the power semiconductor element based on an output voltage of the switching frequency change unit. In generating the final PWM signal, the final PWM signal for generating the maximum duty command voltage may be generated by multiplying the duty value of the temporary PWM signal for generating the maximum duty command voltage input to the PWM IC based on an input voltage by the factor value based on an output voltage of the switching frequency change unit.

According to the present invention, the clamp capacitor and the power semiconductor in the LDC may be prevented from being damaged even when a control abnormality occurs due to a disturbance or the like, by limiting the maximum duty of switching of power semiconductor elements of the LDC based on the input voltage input from the high voltage battery and the output voltage of the switching frequency change unit. In addition, a higher output may be ensured by eliminating the maximum duty change portion of the power semiconductor elements according to the output voltage of the switching frequency change unit and by increasing the operation duty of the LDC. Furthermore, when a voltage range of a high voltage battery according to a vehicle type is changed, it is not necessary to redesign the LDC and the power semiconductor elements, whereby unified LDCs may be utilized in various types of vehicles. Accordingly, manufacturing cost of the LDC may be reduced.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, a control system and method of a low voltage DC-DC converter (LDC) according to an exemplary embodiment of the present invention will be described in detail with reference to the accompanying drawings.

Figure 2:
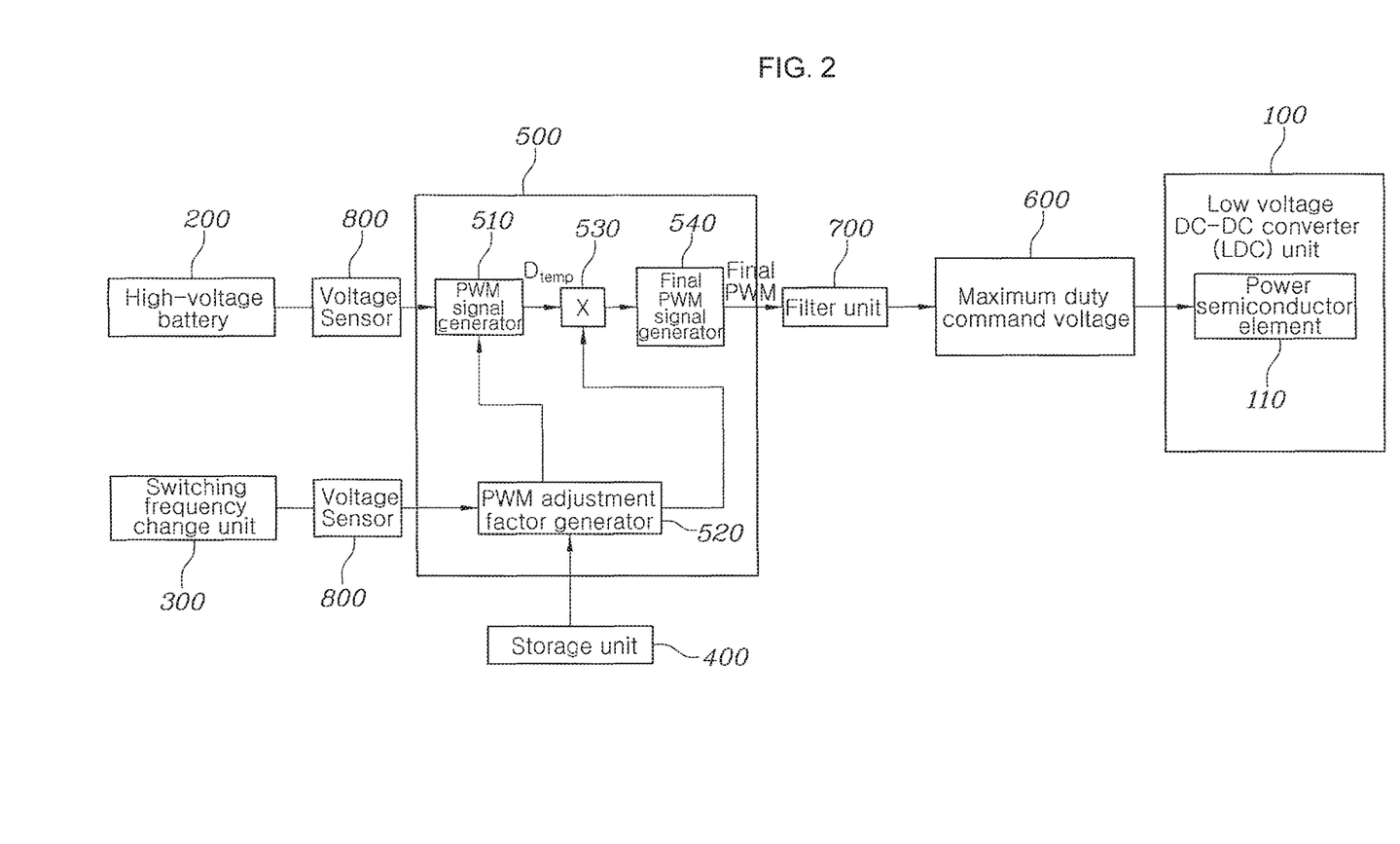
FIG. 2 is a block diagram schematically illustrating a configuration of a control system of an LDC according to an exemplary embodiment of the present invention.
Figure 3:
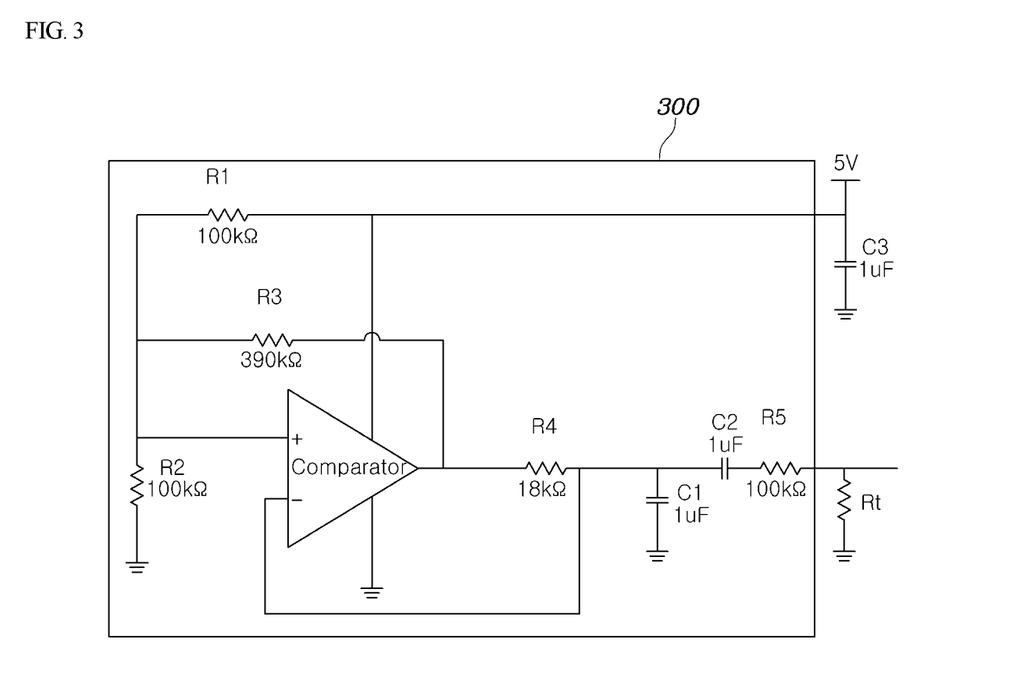
FIG. 3 is a circuit diagram of a switching frequency change unit in a control system of an LDC according to an exemplary embodiment of the present invention.
Figure 4:
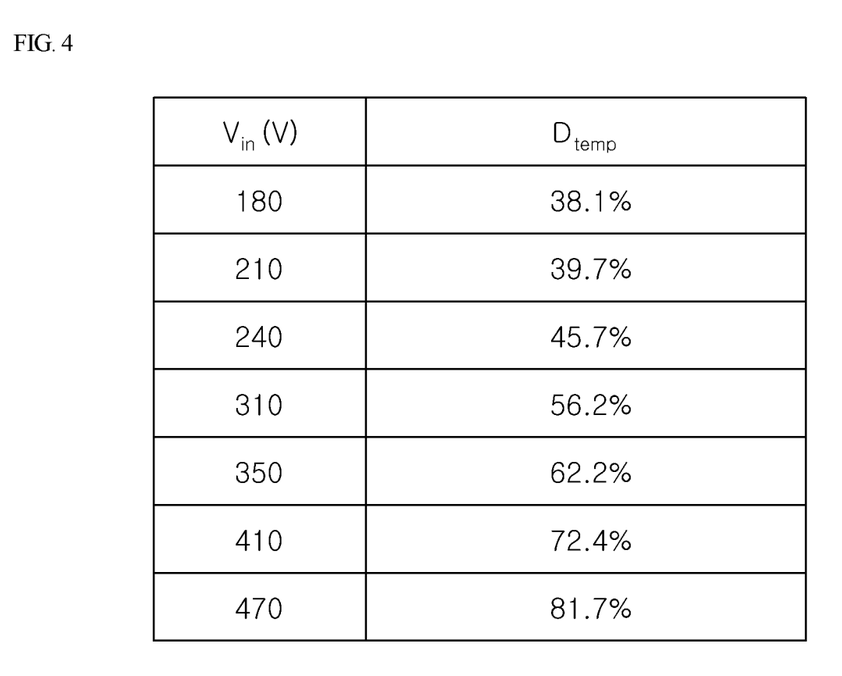
FIG. 4 is a table including duty information of a PWM signal, wherein the duty information stored in a storage unit is for generating maximum duty command voltage input to a PWM IC by input voltage input from a high voltage battery in a control system of an LDC according to an exemplary embodiment of the present invention.
Figure 5:
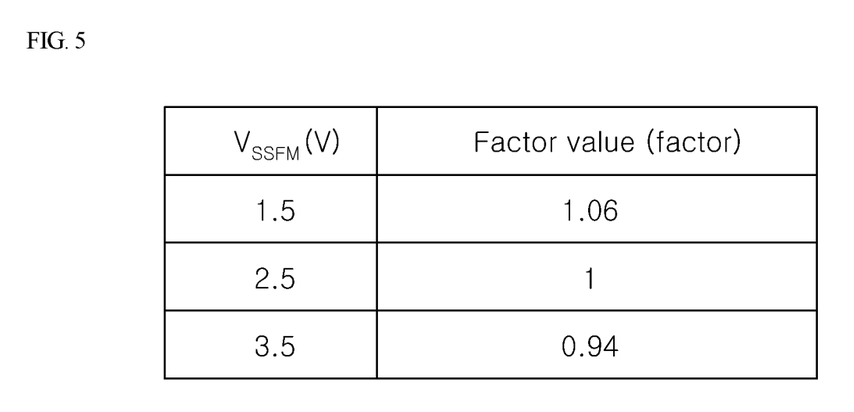
FIG. 5 is a table including factor value information for eliminating a maximum duty change portion of a power semiconductor element according to output voltage of a switching frequency change unit stored in a storage unit in a control system of an LDC according to an exemplary embodiment of the present invention.

FIG. 2 is a block diagram schematically illustrating a configuration of a control system of the LDC according to an exemplary embodiment of the present invention, FIG. 3 is a circuit diagram of a switching frequency change unit in a control system of the LDC according to an exemplary embodiment of the present invention, FIG. 4 is a table including duty information of a PWM signal, wherein the duty information stored in a storage unit is for generating maximum duty command voltage input to a PWM IC by input voltage input from a high voltage battery in a control system of an LDC according to an exemplary embodiment of the present invention, and FIG. 5 is a table including factor value information for eliminating a maximum duty change portion of a power semiconductor element according to output voltage of a switching frequency change unit stored in a storage unit in a control system of an LDC according to an exemplary embodiment of the present invention.

As illustrated in FIG. 2, the control system of the LDC according to an exemplary embodiment of the present invention may include an LDC unit 100, a switching frequency change unit 300, a microcomputer 500, and a PWM IC 600 and may include a storage unit 400. Particularly, the LDC unit 100 may include a power semiconductor element 110 and may be configured to convert power supplied from a high voltage battery 200 of a vehicle into power of low voltage. The power semiconductor element 110 may be a field effect transistor (FET) according to an exemplary embodiment, and other power semiconductor elements may be used as the power semiconductors in the present invention.

In addition, the high-voltage battery 200, which is a high-output and large-capacity battery, may be configured to supply power for driving a motor and may operate as an energy source configured to supply electric power for charging an auxiliary battery and to an electric field load of a vehicle. The high-voltage battery 200 may include a plurality of battery cells. Accordingly, the high-voltage battery 200 may be configured to output high-voltage power of several hundred volts or greater by having a sum of output voltage of the battery cells as an output voltage. More specifically, the LDC unit 100 may be configured to convert the power supplied from the high voltage battery 200 into a low voltage to provide power to at least one of the auxiliary battery (not shown) and the electric load (not shown) of the vehicle. For example, when a 12V auxiliary battery and the electric load are used in a vehicle, the LDC unit 100 may be configured to decrease high-voltage of the power supplied from the high-voltage battery 200 to 12V and provide the power to the auxiliary battery and the electric field load.

The switching frequency change unit 300 may be configured to change a switching frequency of the power semiconductor element 110 to reduce a switching noise of the power semiconductor element 110 in the LDC unit 100. Specifically, the switching frequency change unit 300 of the present invention may operate as a relaxation oscillator using a comparator circuit as illustrated in FIG. 3. In addition, the switching frequency change unit 300 may be a spread spectrum frequency modulation (SSFM) device according to an exemplary embodiment. As the SSFM device and the relaxation oscillator are well-known techniques, a detailed description thereof will be omitted.

The duty information of the PWM signal for generating the maximum duty command voltage input to the PWM IC 600 by the input voltage input from the high voltage battery 200 and the factor value information for eliminating the maximum duty change portion of the power semiconductor element 110 according to the output voltage of the switching frequency change unit 300 may be stored in the storage unit 400. Specifically, the duty information of the PWM signal for generating the maximum duty command voltage by the input voltage input from the high voltage battery 200 may be stored in the storage unit 400 as illustrated in FIG. 4.

In particular, the table including the duty information of the PWM signal, stored in the storage unit 400, for generating the maximum duty command voltage by the input voltage input from the high voltage battery 200 may be generated based on: selecting the maximum operation duty of the power semiconductor elements 110 capable of producing the maximum output or the rated output under the condition that the withstand voltage specification of the clamp capacitor (not shown) and the power semiconductor element 110 in the LDC 100 are not exceeded when a control duty margin is taken into consideration; deriving the final maximum output duty of the PWM IC 600 by the input voltage including the duty loss between PWM IC 600 and the power semiconductor elements 110; and deriving the maximum duty command voltage value applied to the PWM IC 600 by the input voltage input from the high voltage battery 200.

In addition, the maximum duty command voltage in the present invention may be a voltage value for limiting the maximum duty at which the power semiconductor element 110 operates. Further, the factor value information for eliminating the maximum duty change portion of the power semiconductor element 110 according to the output voltage of the switching frequency change unit 300 may be stored in the storage unit 400 as illustrated in FIG. 5. Specifically, the switching frequency of the power semiconductor element 110 may be changed based on the output voltage of the switching frequency change unit 300. For example, when the output voltage of the switching frequency change unit 300 is substantial, the switching frequency of the power semiconductor element 110 may be decreased, and, when the output voltage of the switching frequency change unit 300 is minimal, the switching frequency of the power semiconductor element 110 may be increased.

Meanwhile, as described above, when the output voltage of the switching frequency change unit 300 is changed, the switching frequency of the power semiconductor element 110 may be changed, and, as the switching frequency of the power semiconductor element 110 is changed, the maximum duty value at which the power semiconductor element 110 operates may be changed. In other words, as the output voltage of the switching frequency change unit 300 is changed, the maximum duty value at which the power semiconductor element 110 operates may be changed. As a result, the voltage applied to the power semiconductor element 110 and the clamp capacitor (not shown) in the LDC 100 may be influenced. In a severe case, the power semiconductor element 110, the clamp capacitor (not shown), and the like may be burned out or otherwise damaged. As illustrated in FIG. 5, in the present invention, a factor value for eliminating the maximum duty change portion of the power semiconductor element 110 based on the output voltage value of the switching frequency change unit 300 may be stored in the storage unit 400, and the stored factor value may be used when the final PWM signal is generated in the microcomputer 500 described below.

The microcomputer 500 (e.g. processor) may be configured to generate the final PWM signal based on the input voltage value input from the high voltage battery 200 and the output voltage value of the switching frequency change unit 300, thereby applying the maximum duty command voltage to the PWM IC. In particular, the microcomputer 500 may include a temporary PWM signal generation unit 510 configured to generate a duty of a temporary PWM signal for generating a maximum duty command voltage input to the PWM IC based on an input voltage input from the high voltage battery 200, a PWM adjustment factor generation unit 520 configured to generate an adjustment factor value based on an output voltage of the switching frequency change unit 300, a multiplier 530 configured to multiply the duty of the temporary PWM signal generated in the temporary PWM signal generation unit 510 by the adjustment factor value generated in the PWM adjustment factor generation unit 520, and a final PWM signal generation unit 540 configured to generate the maximum duty command voltage based on results of multiplication operations through the multiplier 530.

Further, the microcomputer 500 including the above-described configuration may be configured to generate a duty value of the temporary PWM signal for generating the maximum duty command voltage input to the PWM IC 600 according to the input voltage based on the input voltage value input from the high voltage battery 200 and the information stored in the storage unit 400. With reference to FIG. 4, for example, when the input voltage input from the high voltage battery 200 is about 180V, the microcomputer 500 may be configured to generate a PWM signal having the duty of about 38.1% and thus, the maximum duty command voltage input to the PWM IC 600 may be generated. According to another exemplary embodiment, when the input voltage input from the high voltage battery 200 is about 310V, the microcomputer 500 may be configured to generate a PWM signal having the duty of about 56.2% and thus, the maximum duty command voltage input to the PWM IC 600 may be generated.

In addition, the microcomputer 500 may be configured to derive an adjustment factor value according to the output voltage of the switching frequency change unit 300 and the information stored previously in the storage unit 400. With reference to FIG. 5, for example, when the output voltage value of the switching frequency change unit 300 is about 1.5 V, the microcomputer 500 may be configured to derive a factor value of about 1.06, and, when output voltage of the switching frequency change unit 300 is about 3.5 V, the microcomputer 500 may be configured to derive a factor value of about 0.94.

Further, the microcomputer 500 may be configured to generate a final PWM signal for generating the maximum duty command voltage based on the duty of the temporary PWM signal and the adjustment factor value derived by the above-described method, thereby applying the maximum duty command voltage to the PWM IC 600. Particularly, the microcomputer 500 may be configured to generate a final PWM signal for generating a maximum duty command voltage by multiplying a duty value of a temporary PWM signal for generating a maximum duty command voltage input to the PWM IC 600 based on an input voltage by an adjustment factor value according to an output voltage of the switching frequency change unit 300.

The PWM IC 600 may be configured to apply PWM voltage to the power semiconductor element 110 and thus, the power semiconductor element 110 of the LDC 100 may be operated while not exceeding the maximum duty based on the maximum duty command voltage applied from the microcomputer 500. In the present invention, the microcomputer 500 may be configured to generate the maximum duty command voltage limiting the maximum duty at which the power semiconductor element 110 operates, based on the input voltage input from the high voltage battery 200 and the output voltage of the switching frequency change unit 300 and may be configured to apply the maximum duty command voltage to the PWM IC 600. Then, the PWM IC 600 may be configured to operate the power semiconductor element 110 to not exceed the maximum duty based on the maximum duty command voltage applied thereto. Accordingly, even when a control malfunction occurs due to a disturbance or the like at a high input voltage from the high voltage battery 200, the power semiconductor element 110 may operate to not exceed the maximum duty (e.g. may be operated at less than the maximum duty). As a result, it may be possible to prevent the clamp capacitor and the power semiconductor element 110 in the LDC from exceeding a withstand voltage thereof and being damaged.

Meanwhile, the control system of an LDC according to an exemplary embodiment of the present invention may further include a filter unit 700 disposed between the microcomputer 500 and the PWM IC 600 and configured to smooth the maximum duty command voltage output from the microcomputer 500. At this time, the maximum duty command voltage output from the microcomputer 500 may be a 5V PWM voltage having a final PWM signal for generating maximum command voltage according to an exemplary embodiment. In addition, the 5V PWM voltage having the final PWM signal output from the microcomputer 500 may be smoothed (e.g. noise, outliers, etc. may be removed) passing through the filter unit 700 and applied to the PWM IC 600 in direct current (DC) voltage. Furthermore, the control system of an LDC according to an exemplary embodiment of the present invention may further include voltage sensors 800 configured to sense voltage input from the high voltage battery 200 and voltage output from the switching frequency change unit 300, respectively.

Figure 6:
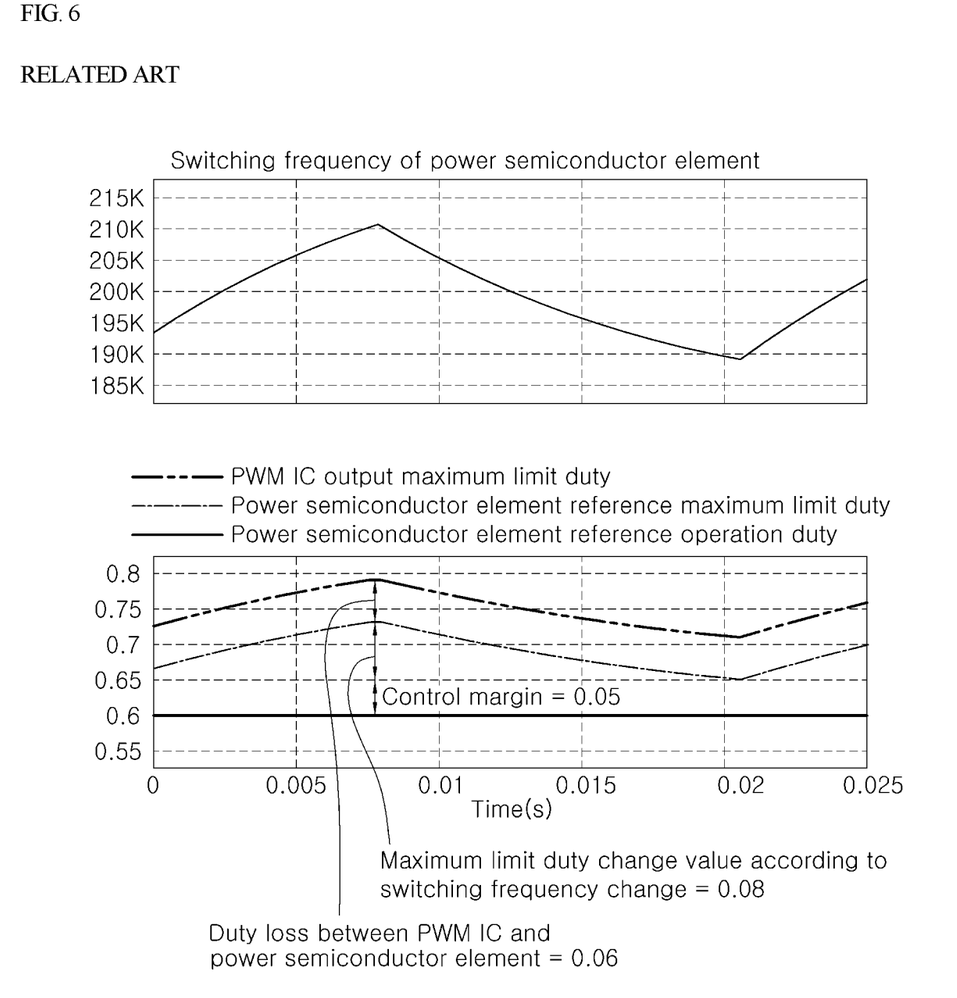
FIG. 6 is a graph illustrating a PWM IC output maximum limit duty, a power semiconductor element reference maximum limit duty, and a power semiconductor element reference operation duty according to a change of a switching frequency of a power conversion element in a conventional control system of an LDC according to the related art.
Figure 7:
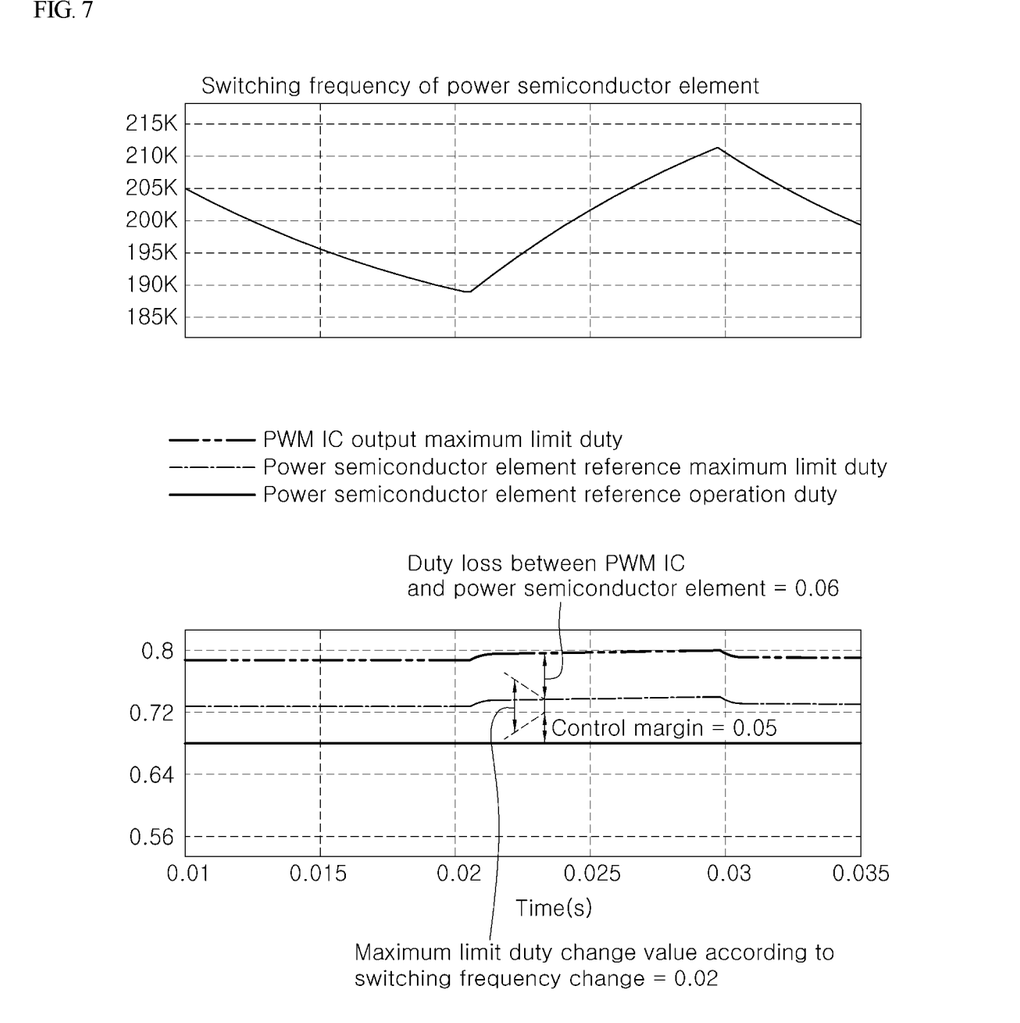
FIG. 7 is a graph illustrating a PWM IC output maximum limit duty, a power semiconductor element reference maximum limit duty, and a power semiconductor element reference operation duty according to a change of a switching frequency of a power conversion element in a control system of an LDC according to an exemplary embodiment of the present invention.

Meanwhile, FIG. 6 is a graph illustrating a PWM IC output maximum limit duty, a power semiconductor element reference maximum limit duty, and a power semiconductor element reference operation duty according to a change of a switching frequency of a power conversion element in a conventional control system of an LDC according to the related art. FIG. 7 is a graph illustrating a PWM IC output maximum limit duty, a power semiconductor element reference maximum limit duty, and a power semiconductor element reference operation duty according to a change of a switching frequency of a power conversion element in a control system of an LDC according to an exemplary embodiment of the present invention.

As illustrated in FIGS. 6 and 7, according to the control system of an LDC according to the present invention, by limiting the maximum duty of the power semiconductor element 110 according to the input voltage input from the high-voltage battery 200, even when a control malfunction occurs due to a disturbance or the like when a high input voltage is input from the high-voltage battery 200, the power semiconductor element 110 may operate to not exceed the maximum duty. As a result, it may be possible to prevent the clamp capacitor and the power semiconductor element 110 in the LDC from exceeding a withstand voltage thereof and being damaged. In addition, by eliminating the change portion of the maximum duty at which the power semiconductor element 110 operates according to the output voltage of the switching frequency change unit 300 and by increasing the maximum operable duty of the LDC, it may be possible to secure a higher output compared with the conventional one, and thus it may be possible to secure the output of the LDC in a state where the voltage of the high voltage battery is low.

Figure 8:
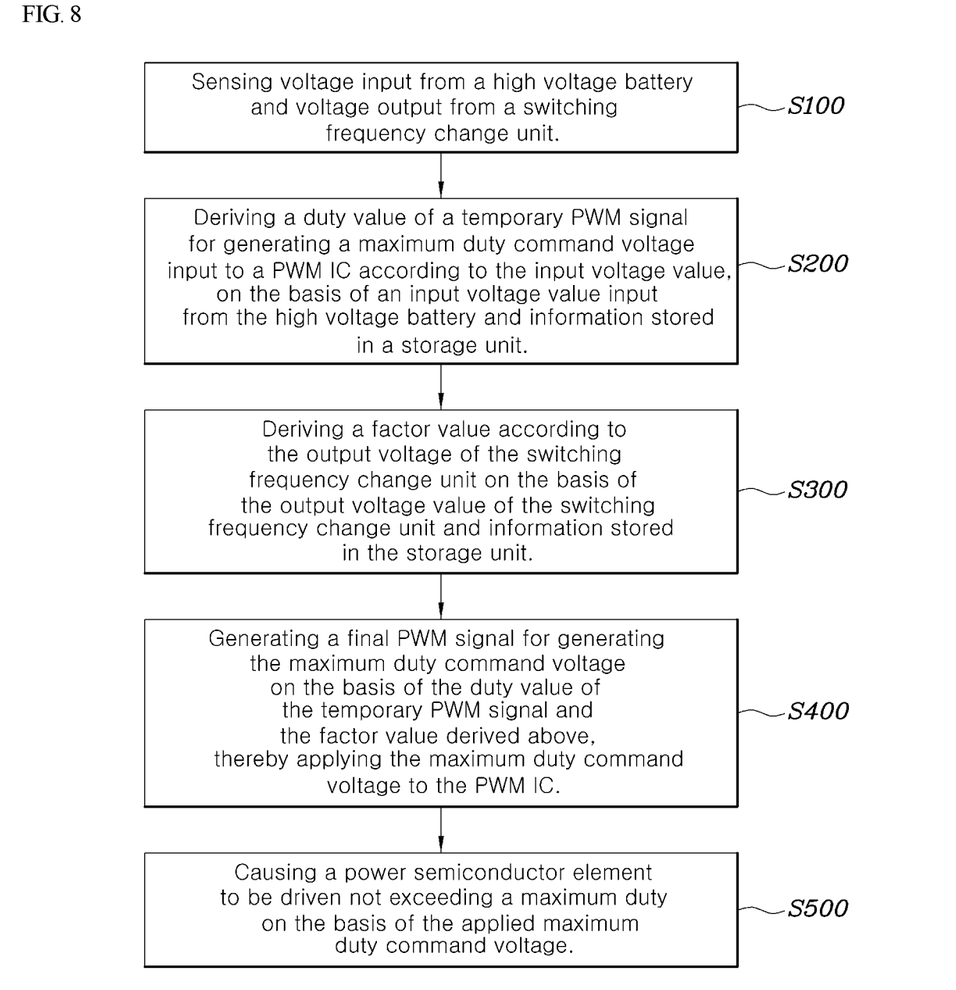
FIG. 8 is a flowchart illustrating a flow of a control method of an LDC according to an exemplary embodiment of the present invention.

FIG. 8 is a flowchart illustrating a flow of a control method of an LDC according to an exemplary embodiment of the present invention. The method described herein below may be executed by a processor of a controller. As illustrated in FIG. 8, the control method of an LDC according to an exemplary embodiment of the present invention may include: sensing voltage input from the high voltage battery and voltage output from a switching frequency change unit; deriving a duty value of a temporary PWM signal for generating a maximum duty command voltage input to the PWM IC according to the input voltage value, based on the input voltage value input from the high voltage battery and information stored in the storage unit; deriving a factor value according to the output voltage of the switching frequency change unit and information stored in the storage unit; generating a final PWM signal for generating a maximum duty command voltage based on the duty value of the temporary PWM signal and the factor value derived above, thereby applying the maximum duty command voltage to the PWM IC; and operating the power semiconductor element to not exceed a maximum duty based on the maximum duty command voltage applied thereto.

In addition, prior to the sensing the voltage input from the high voltage battery and the voltage input from the switching frequency change unit, the control method of an LDC according to an exemplary embodiment of the present invention may further include storing the duty information of the PWM signal for generating the maximum duty command voltage input to the PWM IC by the input voltage input from the high voltage battery, and the factor value information for eliminating a maximum switching duty change portion of the power semiconductor element according to an output voltage of the switching frequency change unit. Meanwhile, in generating the final PWM signal, a final PWM signal for generating a maximum duty command voltage may be generated by multiplying a duty value of a temporary PWM signal for generating a maximum duty command voltage input to the PWM IC according to the input voltage by a factor value according to an output voltage of the switching frequency change unit.

Technical features in the detailed steps of the control method of an LDC according to the present invention are the same as technical features of the detailed configuration in the control system of an LDC according to the present invention described above, so a detailed description thereof will be omitted.

What is claimed is:

1. A control system of a low voltage direct current-direct current (DC-DC) converter, comprising: a low voltage DC-DC converter unit including a power semiconductor element and configured to convert power supplied from a high voltage battery of a vehicle into power of low voltage;
   a switching frequency change unit configured to change a switching frequency of the power semiconductor element; and
   a microcomputer configured to generate a final pulse width modulation (PWM) signal based on an input voltage value input from the high voltage battery and an output voltage value of the switching frequency change unit to apply a maximum duty command voltage to a PWM controller,
   wherein the PWM controller is configured to apply PWM voltage to the power semiconductor element to drive the power semiconductor element at less than a maximum duty based on the maximum duty command voltage applied from the microcomputer; and
   a storage unit configured to store a duty information of the PWM signal for generating the maximum duty command voltage input to the PWM controller by using the input voltage input from the high voltage battery and a factor value information for eliminating a maximum duty change portion of the power semiconductor element based on the output voltage of the switching frequency change unit.

2. The system of claim 1, wherein the microcomputer includes:
   a temporary PWM signal generation unit configured to generate a duty of a temporary PWM signal for generating a maximum duty command voltage input to the PWM controller based on an input voltage input from the high voltage battery;
   a PWM adjustment factor generation unit configured to generate an adjustment factor value based on an output voltage of the switching frequency change unit;
   a multiplier configured to multiply the duty of the temporary PWM signal generated in the temporary PWM signal generation unit by the adjustment factor value generated in the PWM adjustment factor generation unit; and
   a final PWM signal generation unit configured to generate the maximum duty command voltage based on results of a product operation through the multiplier.

3. The system of claim 1, wherein the microcomputer is configured to: derive a duty value of the temporary PWM signal for generating the maximum duty command voltage input to the PWM controller based on the input voltage and a factor value according to the output voltage of the switching frequency change unit, based on the input voltage value input from the high voltage battery, the output voltage value of the switching frequency change unit, and the information stored in the storage unit; and generate a final PWM signal for generating the maximum duty command voltage based on the duty value of the temporary PWM signal and the derived factor value to apply the maximum duty command voltage to the PWM controller.

4. The system of claim 1, wherein the maximum duty command voltage is a voltage value for limiting the maximum duty at which the power semiconductor element operates.

5. The system of claim 1, further comprising:
a filter unit disposed between the microcomputer and the PWM controller and configured to smooth the voltage output from the microcomputer.

6. The system of claim 1, further comprising:
voltage sensors configured to sense voltage input from the high voltage battery and voltage output from the switching frequency change unit, respectively.

7. The system of claim 1, wherein the microcomputer is configured to generate the final PWM signal for generating a maximum duty command voltage by multiplying a duty value of a temporary PWM signal for generating the maximum duty command voltage input to the PWM controller according to the input voltage by a factor value according to the output voltage of the switching frequency change unit.

8. A control method of a low voltage direct current-direct current (DC-DC) converter, comprising: sensing by a processor, voltage input from a high voltage battery and voltage output from a switching frequency change unit;
deriving by the processor, a duty value of a temporary pulse width modulation (PWM) signal for generating a maximum duty command voltage input to a PWM controller according to the input voltage value, based on an input voltage value input from the high voltage battery and information stored in a storage unit;
deriving by the processor, a factor value based on the output voltage of the switching frequency change unit and information stored in the storage unit;
generating, by the processor, a final PWM signal for generating the maximum duty command voltage based on the duty value of the temporary PWM signal and the derived factor value to apply the maximum duty command voltage to the PWM controller;
operating, by the processor, a power semiconductor element to be driven at less than a maximum duty based on the maximum duty command voltage applied thereto; and
wherein prior to sensing the voltage input from the high voltage battery and the voltage output from the switching frequency change unit:
storing by the processor, the duty information of the PWM signal for generating the maximum duty command voltage input to the PWM controller by using an input voltage input from the high voltage battery and the factor value information for eliminating a maximum switching duty change portion of the power semiconductor element according to an output voltage of the switching frequency change unit.

9. The method of claim 8, wherein, in generating the final PWM signal, the final PWM signal for generating the maximum duty command voltage is generated by multiplying the duty value of the temporary PWM signal for generating the maximum duty command voltage input to the PWM controller according to an input voltage by the factor value according to an output voltage of the switching frequency change unit.

* * * * *